United States Patent [19]

Arditty et al.

[11] Patent Number: 4,743,115
[45] Date of Patent: May 10, 1988

[54] METHOD OF COILING AN OPTICAL FIBER GYROSCOPE AND AN OPTICAL FIBER COIL THUS OBTAINED

[75] Inventors: Hervé Arditty, Marly le Roi; Jean P. Bettini, Perthes; Serge Botti, Viroflay; Philippe Graindorge, Magny les Hameaux; Hervé Lefevre, Paris, all of France

[73] Assignee: Thomson-CSF, Paris, France

[21] Appl. No.: 876,400

[22] Filed: Jun. 20, 1986

[30] Foreign Application Priority Data

Jun. 21, 1985 [FR] France .............................. 85 09499

[51] Int. Cl.$^4$ ................................................. G01B 9/02
[52] U.S. Cl. .................................... 356/350; 242/54 R
[58] Field of Search ...................... 356/350; 242/54 R

[56] References Cited

U.S. PATENT DOCUMENTS 3,102,953  9/1963  Wallace ............................... 356/350
4,699,451 10/1987  Mohr .................................... 356/350

FOREIGN PATENT DOCUMENTS 2409518 11/1977  France ............................... 356/350
0242315 12/1985  Japan ................................. 356/350

Primary Examiner—Davis L. Willis
Assistant Examiner—S. A Turner
Attorney, Agent, or Firm—Oblon, Fisher, Spivak, McClelland & Maier

[57] ABSTRACT

A method of coiling an optical fiber gyroscope and an optical fiber coil thus obtained, which method consists in coiling, on a cylindrical support comprising a central channel, a first layer for forming a helical optical fiber winding with constant pitch, passing the optical fiber through the central channel in the form of a single turn and coiling additional layers, in the same direction as the first layer, using the interturn spaces of the underlying layers.

10 Claims, 4 Drawing Sheets

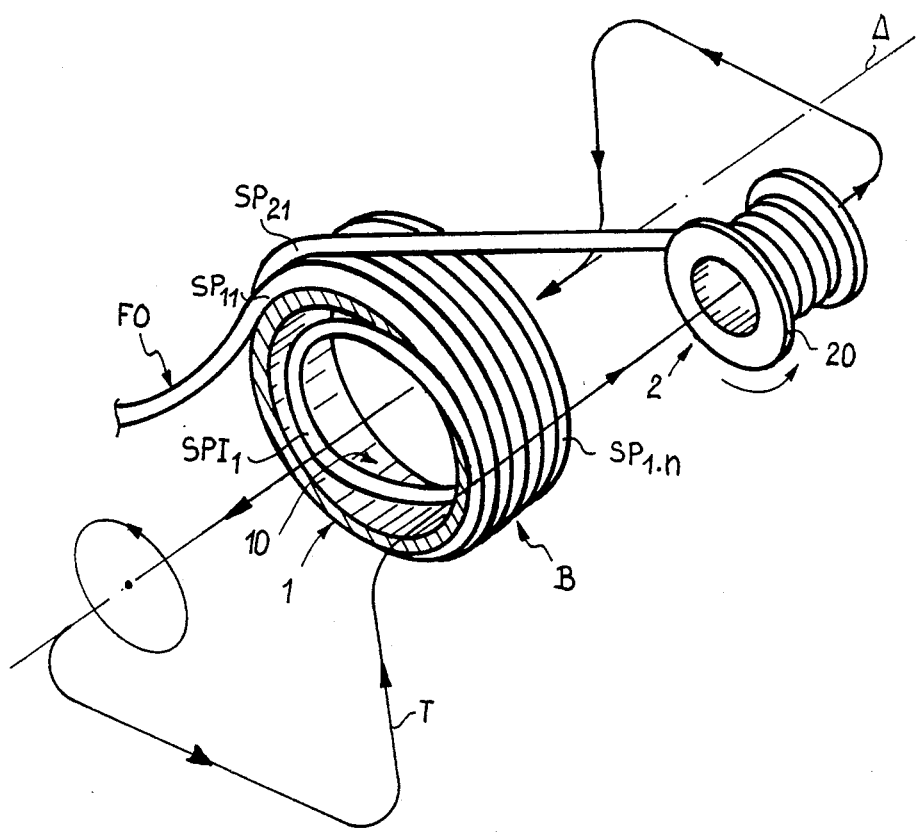
FIG_1

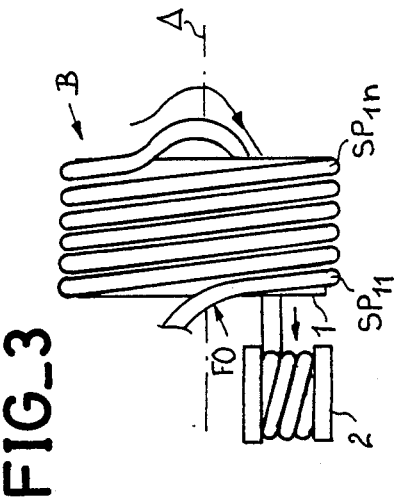
FIG._2
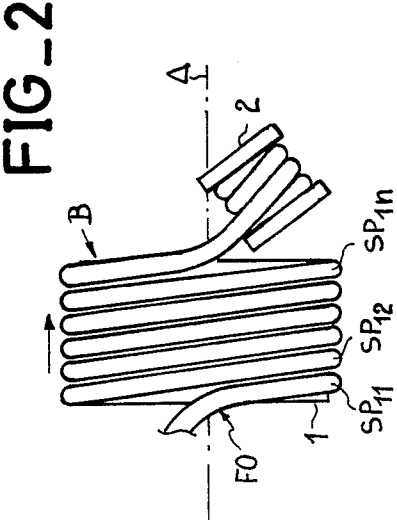
FIG._3
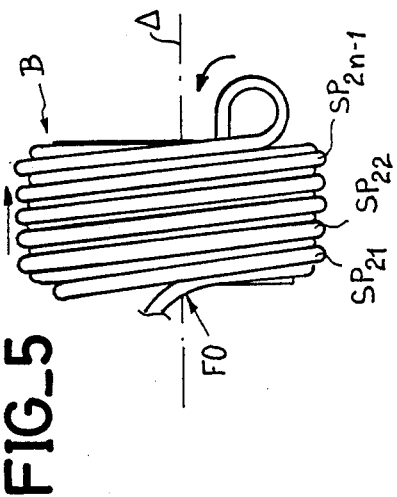
FIG._4
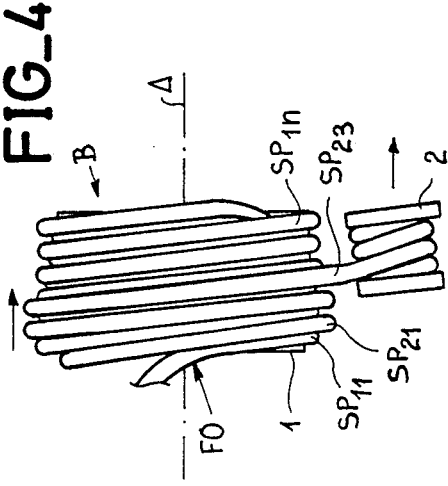
FIG._5

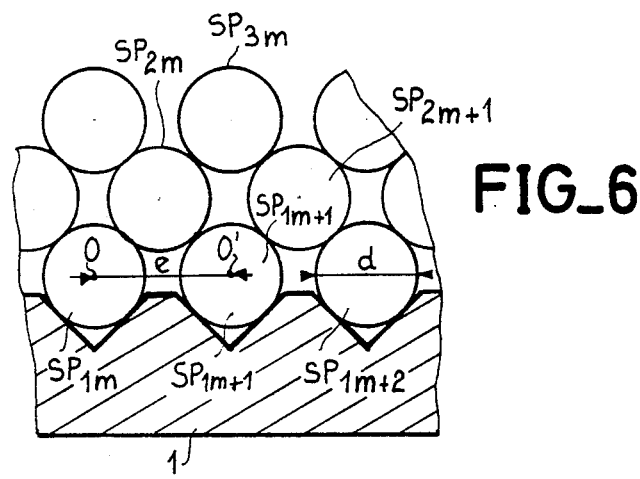
FIG_6
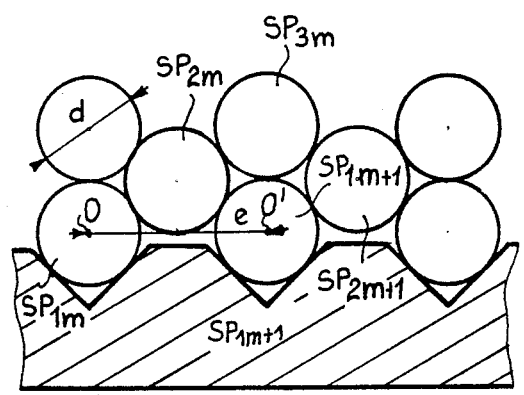
FIG_7
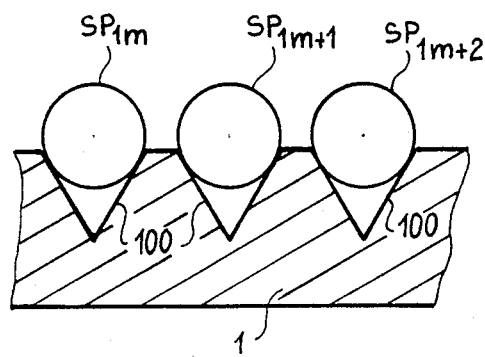
FIG_8

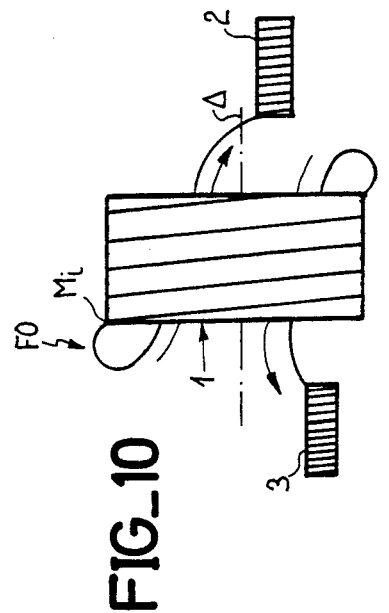
FIG_10
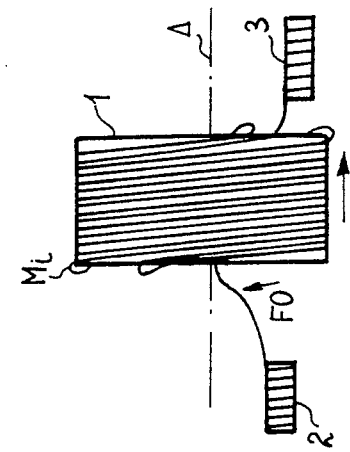
FIG_12
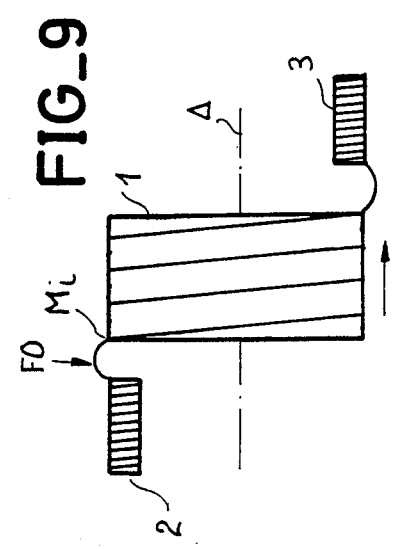
FIG_9
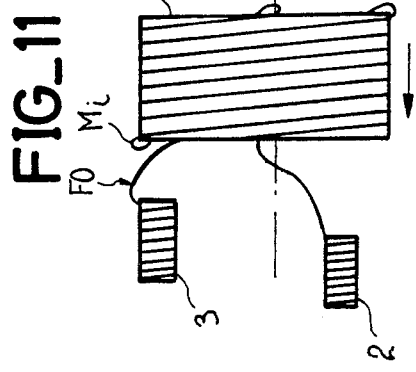
FIG_11

METHOD OF COILING AN OPTICAL FIBER GYROSCOPE AND AN OPTICAL FIBER COIL THUS OBTAINED

BACKGROUND OF THE INVENTION

The present invention relates to a method of coiling an optical fiber forming the ring of a gyroscope. A known type of gyroscope is formed from a ring interferometer, also called SAGNAC interferometer.

Such an interferometer comprises mainly a light energy source formed generally by a laser; an optical device formed either by a number of mirrors or by an optical fiber wound on itself, this device forming a wave guide; a device for separating and mixing the light and a device for detecting and processing the detected signal.

It is known that in these interferometers there exist two waves coming from the separator device and travelling in opposite directions over the same optical path.

A fundamental property of ring interferometers is the reciprocity which may be expressed as follows: any disturbance of the optical path affects the two waves in the same way despite the fact that these two waves are subjected to it neither exactly at the same time nor in the same direction.

There exist however two types of disturbances which affect the reciprocity.

These are, on the one hand, disturbances which vary in time, in a lapse of time comparable to the time taken by the waves for propagating along the optical path of the interferometer; and on the other hand, so called "non reciprocal" disturbances, that is to say disturbances which do not have the same effect on the waves depending on whether they propagate in one direction or in the other along the optical path. These are physical effects which destroy the symmetry of the medium in which the waves propagate.

Two known effects present this latter type of disturbance:

the Faraday effect, or colinear magneto-optical effect, by which a magnetic field creates a preferential orientation of the spin of the electrons of an optical material;

and the Sagnac effect, or relativistic inertial effect, in which the rotation of the interferometer with respect to a Gallilean reference destroys the symmetry of the propagation time. This effect is used for forming gyroscopes more particularly.

The invention is situated in this field of application.

In the absence of "non reciprocal" disturbances, the phase difference (which will be called hereafter $\Delta\phi$) between the two waves which are recombined in the separation and mixing device after travelling over the optical path is zero. In the opposite case, that is to say when the system rotates in inertial space, the phase difference obeys the relationship:

$$\Delta\phi = \frac{8\pi f}{C^2} \vec{S} \cdot \vec{\Omega} \qquad (1)$$

in which relationship f is the frequency of the optical wave and C the speed of light in a vacuum.

The phase shift $\Delta\phi$ depends on the scalar product between the apparent surface vector $\vec{S}$ of the fiber coil used for forming the ring and the rotation vector $\vec{\Omega}$. The system is therefore sensitive to the flow of the rotation vector through the coil.

The apparent surface vector S is defined by the relationship:

$$S = \oint \tfrac{1}{2}\vec{R}(M) \wedge \vec{dl} \qquad (2)$$

in which relationship the sign $\oint$ represents the integral on the closed contour defined by the path followed by the line along the fiber, M any point on this closed contour and dl is the progression difference vector.

The direction vector $\vec{S}$ is parallel to the axis of symmetry of the coil. The system detects then the rotations about this axis and is insensitive to rotations about orthogonal axes. For numerous navigational applications, it is of basic importance that the axis be very stable. This stability, called "laying", may be affected by movements of the different turns of the fiber coil.

The problem is simple to solve in the case of a coil with a single layer. It is possible to form in a tube supporting the coil a helical groove forming a screw thread, of a period greater than the diameter of the fiber, and coiling the fiber in the helical groove thus formed. A problem arises for the second layer. It may be wound back along the support tube in the same direction of rotation, but then the winding pitch is reversed. At each turn, the fiber will have to leave the groove defined by the preceding layer, pass over a turn and come back into the following groove. Such an arrangement is described for example in U.S. Pat. No. 3,102,953, more particularly in FIG. 2. This passage point is uncertain and may vary in particular as a function of the temperature: expansion phenomena. That modifies the orientation of the turn and so affects the laying stability, creating in particular hysteresis if the fiber does not come back into position during a heat cycle. If the direction of rotation in the coiling is now reversed, it is then possible to wind the second layer in the groove defined by the first one, but the Sagnac effect due to the rotation will be cancelled out, just as the self inductance of an electromagnetic coil is cancelled out.

The aim of the present invention is to provide a coiling process for winding the optical fiber forming the ring of a gyrometer which improves the laying stability thereof.

SUMMARY OF THE INVENTION

The invention provides then a process for coiling a gyroscope of the Sagnac interferometer type comprising a ring formed of a multilayer optical fiber coil, comprising at least:

a preliminary step of coiling an optical fiber length required for forming said coil over at least one intermediate coil;

a first step of coiling a first layer of turns, on a cylindrical support comprising a central channel of circular section, so as to form a helical winding with constant pitch by unwinding the optical fiber from the intermediate coil;

a second step consisting in introducing said intermediate coil inside the central channel, forming a single spiral turn on the inner wall of the central channel, wound in the same direction as the turns of the second layer, and removing the intermediate coil from the central channel through the end opposite the introduction end;

and a third step of coiling an additional layer of turns by winding the optical fiber in the same direction as the turns of the underlying layer and using the interturn spaces of this layer as channel for guiding and positioning the optical fiber.

The invention also relates to the optical fiber coil obtained by the coiling method.

BRIEF DESCRIPTION OF THE DRAWINGS

The invention will be better understood and other features and advantages will be clear from the following description and accompanying drawings in which:

FIG. 1 illustrates the complete process of coiling a layer in accordance with the invention FIGS. 2 to 5 illustrate steps of coiling two successive layers;

FIGS. 6 to 8 illustrate details of an optical fiber coil formed in accordance with the method of the invention; and FIGS. 9 to 12 illustrate an additional variant of the method of the invention.

DESCRIPTION OF THE PREFERRED EMBODIMENTS

The method of the invention consists in passing the optical fiber spirally, after coiling of a layer, inside a carrier tube, still in the same winding direction. Coming out at the other end of the tube, it is then possible to coil the second layer in the same direction of rotation while following the groove defined by the preceding layer. That requires coiling the whole of the fiber on an intermediate spool, of an overall diameter less than the inner diameter of the supporting tube, so as to be able to pass it easily through this tube. this operation may be repeated several times. A layer of n turns defines $n-1$ interfiber spaces able to receive the fiber of the next layer, the different layers rising in staggered arrangement. Each turn is now held laterally by the interturn space of the preceding layer which gives a much better positioning stability and reduces the effects of thermal hysteresis.

FIG. 1 illustrates schematically the whole of the operations for coiling a complete layer.

To sum up, the method consists in first of all loosely winding the whole of the fiber FO on an intermediate spool 2 of small diameter and of a length sufficient to contain it as a whole. The fiber of the spool is then rewound on a supporting tube 1 with a pitch greater than the diameter of the tube. At the end of the first layer the spool is passed inside the support tube where the fiber is then positioned spirally. Then a second layer may be wound in the interturn gap of the preceding layer. The operation is then repeated at each layer.

In FIG. 1, the turns of the first layer are referenced $SP_{11}$ to $SP_{1n}$. Similarly, the turn of this second layer shown in FIG. 1 is referenced $SO_{21}$. The cylindrical support 1 comprises a central channel 10 of a diameter greater than the overall external diameter 20 of spool 2 on which the optical fiber FO is wound.

The axis of the coil B of optical fiber FO, which is formed layer by layer, is referenced $\Delta$.

In FIG. 1, the path followed by spool 2 is shown by the reference T.

It is assumed that coiling begins by the left hand portion of support 1, in FIG. 1, and ends, after n turns at the other support end: right hand portion in FIG. 1. Spool 2 also moves, for this, in a direction parallel to the axis $\Delta$ from left to right, whereas the support is rotated about the axis $\Delta$.

Then, it is introduced into the central channel 10 of support 1 and come out at the left. The optical fiber FO is wound spirally, in the form of an internal turn $SP1_i$, against the wall of channel 10, during the passage of spool 2 therethrough. There is a single internal turn per layer.

Then the coiling operation continues with the turns of the second layer which are housed in the interturn spaces of the first layer. Only the first turn $SP_{21}$ of the second layer has been shown in FIG. 1.

The cycle begins again iteratively for coiling the number of layers required.

FIGS. 2 to 5 show in greater detail four stages of the operation for coiling two successive layers, in this case the first and second layers.

In FIG. 2 has been shown the condition of the coil after winding a complete layer: turns $SP_{11}$ to $SP_{1n}$.

Spool 2 is then inserted inside support 1 and leaves on the left: FIG. 3.

The operation of coiling the second layer then begins, as illustrated in FIG. 4: turns $SP_{21}$ to $SP_{23}$.

Finally, after completely coiling the second layer, as illustrated in FIG. 5: turns $SP_{21}$ to $SP_{2n-1}$, spool 2 (not shown in FIG. 5) is again passed inside support 1.

It is naturally assumed that coil B comprises, in its final stage, more than two layers. In the opposite case, the coiling operation would be finished at the stage illustrated by FIG. 5.

There exists a restriction related to the coiling pitch.

In fact, the coiling pitch must of course be greater than the diameter of the fiber but must be less than $\sqrt{3}$ times this diameter if the third layer is not to be raised by the first one.

FIGS. 6 and 7 illustrate two possible situations.

FIG. 6 illustrates a detail of coil B in longitudinal section.

The first layer comprises the turns $SP_{1m}$, $SP_{1m+1}$, $SP_{1m+2}$; m being an arbitrary number between 1 and n. The second layer comprises more particularly two turns $SP_{2m}$, $SP_{2m+1}$ wound in the furrows formed by the interturn spaces of the first layer. Similarly, a turn of the third layer $SP_{3m}$ is disposed in the furrow formed by the interturn space between turns $SP_{2m}$ and $SP_{2m+1}$.

It has been assumed here that the coiling pitch, which may be represented by the distance e between the centers O and O' of the cross sections of two contiguous turns, confirms simultaneously the relationships which have just been mentioned, namely:

$$e > d \tag{3}$$

and $$e < \sqrt{3}d \tag{4}$$

d being the outer diameter of the optical fiber FO with its protective sheath.

FIG. 7 illustrates the case in which the distance e is greater than the $\sqrt{3}d$.

It can be seen that a turn $SO_{3m}$ of the third layer is then raised by a turn $SP_{1m+1}$ of the first layer. Its position in the space between turns $SP_{2m}$ and $SP_{2m+1}$ of the second layer is therefore not precisely defined.

Only the stack illustrated in FIG. 6 has the stability required by the invention, each turn being wedged by two turns of the lower layer without possibility of lateral movement.

To accurately define the position of the turns of the first layer, the support tube 1 may have a helical furrow in the manner of a screw thread. FIG. 8 illustrates this possibility, common moreover to the prior art.

In this FIG. 8 are shown three turns of the first layer $SP_{1m}$ to $SP_{1m+2}$. Support 1 has a helical furrow 100, for example conventionally of V structure, in which the optical fiber FO is positioned for forming the turn $SP_1$ to $SP_{1m+2}$ of the first layer;

In another variant, it is possible to coil an independent prelayer so as to avoid possible machining defects of the support tube from affecting the optical behaviour of the fiber: losses due to microbends, polarization coupling, etc.

Turning again to FIG. 6, the turns of the first layer $SP_{1m}$ to $SP_{1m+2}$ then form a fictitious layer on which the other layers are coiled.

The material for the support tube is not systematically imposed. Its choice results from a compromise between the ease of machining, thermostability, amagnetism and lightness. The use of a meltable wax may also be contemplated for obtaining self supporting coils.

The optical fiber may be buried in an appropriate substance, for example an adhesive hardenable when it is exposed to ultraviolet rays. An example of such a substance is the product sold under the reference Commerciale 6154 of PANACOL. When hardening has been carried out, the mandrel is withdrawn so as to obtain a self supporting coil.

The method which has just been described is susceptible of additional improvements.

It is recognized that variations in time of a thermal gradient applied to the coil may cause a parasite phase shift in an optical fiber gyro. It has been suggested to coil the fiber in alternate layers from its middle, thus placing the symmetrical parts of the coil in proximity.

This approach has been suggested in the article by SCHUPE "Thermally induced non-reciprocity in the fiber-optic interferometer" published in "Applied Optics", no. 19, pages 654–655, of 1980.

The method of the invention remains compatible with this approach with a few modifications. The fiber must be coiled by halves on two intermediate spools so as to be able to unwind it from the middle situated, at the outset, between the two spools. A first layer is then coiled while unwinding one of the intermediate spools, the other remaining fixed to the support tube and so rotating with it. At the end of the first layer, the spools are interchanged by passing them through the carrier tube. The second layer is then coiled from the fiber coming from the second spool and so on. The whole may be finished by a complete layer, the middle of the coil then being at the beginning of the first layer if the number of layers is even, and in the middle if the number of layers is uneven. It may also be preferable to have two half layers coming from each spool, which allows each of the ends to be readily wound if that proves necessary. The middle of the coil is then the end of the first layer if the number of layers is even and the middle if the number of layers is uneven.

FIGS. 9 to 12 illustrate different steps of the coiling method of the invention in one of the above mentioned variants of this approach.

The optical fiber FO is shared out on two intermediate spools 2 and 3. The middle Mi of the fiber FO which, once coiled, will form the ring of the gyrometer is placed, in the example illustrated in FIG. 9, at the beginning of the first layer, the leftmost turn of support 1. FIG. 9 illustrates schematically the respective positions of spool 2, on the left of support 1 and rotating therewith and of spool 3, on the right of support 1 at the end of coiling of the first layer. Spool 3 has moved from the left to the right during this first coiling step.

Then, as illustrated in FIG. 10, the spools 2 and 3 are inverted. The spools 2 and 3 are passed through support 1.

A second layer is then coiled as illustrated in FIG. 11, still in the same direction, spool 2 moving towards the left and spool 3 rotating with support 1.

FIG. 11 illustrates the end of this step.

A new layer is then coiled from spool 3 moving towards the right.

FIG. 12 illustrates the end of this step. At the end of this step, the spools will be again inverted by passing them through the support.

As before, the process is repeated until the required number of layers is obtained.

Each time a spool passes through support 1, the optical fiber is wound spirally on the internal face of the support so as to form a single internal turn.

What is claimed is:

1. A method of coiling a gyroscope of the SAGNAC interferometer type comprising a ring formed of a multilayer optical fiber coil, comprising at least:
    a preliminary step for coiling a length of optical fiber required for forming said coil on at least one intermediate spool;
    a first step for coiling a first layer of turns on a cylindrical support comprising a central channel of circular section, so as to form a helical winding with constant pitch by unwinding the optical fiber from the intermediate spool;
    a second step consisting in introducing said intermediate spool inside the central channel, forming a single turn spirally on the inner wall of the central channel, wound in the same direction as the turns of the first layer, and removing the intermediate spool from the central channel through the end opposite the introduction end;
    and a third step for coiling an additional layer of turns by winding the optical fiber in the same direction as the turns of the underlying layer, and using the interturn spaces of this layer as channel for guiding and positioning the optical fiber.

2. The method as claimed in claim 1, comprising additional steps consisting in repeating the second and third steps so as to form a coil comprising a given number of layers, greater than two.

3. The method as claimed in claim 1, wherein said pitch is chosen greater than the outer diameter of the otical fiber and less than this value multiplied by $\sqrt{3}$.

4. The method as claimed in claim 1, wherein said support comprises on its external wall a helical V shaped groove at said constant pitch in which the optical fiber is wound for forming the first layer.

5. The method as claimed in claim 1, wherein said first layer coiled during the first step is an independent prelayer on which are coiled the layers forming the coil and whose interturn spaces define said constant pitch.

6. The method as claimed in claim 1, wherein said support is made from a meltable material so as to form a self supporting multilayer coil.

7. The method as claimed in claim 1, wherein the preliminary coiling step consists in dividing said length of the optical fiber required for forming the coil into two equal portions and coiling these two equal portions on first and second intermediate spools, and coiling of the successive layers is achieved by alternately unwinding the first and second intermediate spools and by inverting these spools at each layer by passing them through said central channel so as to form a coil in which the middle of the optical fiber winding is situated in the first layer.

8. The method as claimed in claim 7, wherein the number of layers of the coil is even and the middle of the optical fiber winding is at the beginning of the first layer.

9. The method as claimed in claim 7, wherein the number of layers of the coil is uneven and the middle of the winding is in the middle of the first layer.

10. A multilayer optical fiber coil forming the ring of a gyroscope of the SAGNAG interferometer type, comprising:
- a cylindrical support comprising a central channel of circular section;
- a first, inner layer of turns of optical fiber coiled on said cylindrical support so as to form a helical winding with a constant pitch;
- a portion of said optical fiber forming a single turn spirally wound on the inner wall of said central channel and wound in the same direction as the turns of said first layer; and
- an additonal layer of optical fiber wound on said first layer and in the same direction as said first layer, the turns of said additional layer being wound in interturn spaces of said first layer.

* * * * *